United States Patent [19]
Chmielewski

[11] Patent Number: 5,222,476
[45] Date of Patent: Jun. 29, 1993

[54] LOW NOX ASPIRATED BURNER APPARATUS

[75] Inventor: Konrad G. Chmielewski, Fort Smith, Ark.

[73] Assignee: Rheem Manufacturing Company, New York, N.Y.

[21] Appl. No.: 889,175

[22] Filed: May 27, 1992

[51] Int. Cl.$^5$ ............................................. F24H 3/00
[52] U.S. Cl. ............................ 126/110 C; 126/116 R; 126/112; 126/99 A; 431/10; 431/7
[58] Field of Search ............ 126/99 A, 99 R, 110 R, 126/110 C, 116 R, 112; 431/5, 7, 170, 10, 326, 328; 110/204, 203, 214

[56] References Cited

U.S. PATENT DOCUMENTS

| | | | |
|---|---|---|---|
| 3,916,869 | 11/1975 | Dufour | 126/110 R |
| 4,354,821 | 10/1982 | Kesselring et al. | 431/7 |
| 4,375,949 | 3/1983 | Salooja | 431/7 |
| 4,505,666 | 3/1985 | Martin et al. | 431/175 |
| 4,519,770 | 5/1985 | Kesselring et al. | 431/7 |
| 4,582,044 | 4/1986 | Ferguson et al. | 110/214 X |
| 4,730,599 | 3/1988 | Kenedall et al. | 126/91 A |
| 4,878,830 | 11/1989 | Henderson | 431/10 |
| 4,880,378 | 11/1989 | Hums | 431/170 |
| 4,994,579 | 12/1990 | Shellenberger et al. | 126/99 A X |

FOREIGN PATENT DOCUMENTS

| | | | |
|---|---|---|---|
| 2510041 | 9/1975 | Fed. Rep. of Germany | 126/110 |
| 0051224 | 4/1980 | Japan | 110/203 |
| 0119923 | 6/1986 | Japan | 126/77 |

Primary Examiner—Carl D. Price
Attorney, Agent, or Firm—Konneker, Bush & Hitt

[57] ABSTRACT

A low NOx burner assembly of a fuel-fired heating appliance is supplied with an air/fuel mixture having a substantially less than stoichiometric air-to-fuel ratio. The air-rich mixture is partially combusted to create primary combustion products disposed within an open inlet portion of a combustor structure having a catalytic converter operatively positioned within an open outlet portion thereof spaced apart from its open inlet portion. A flow of aspirating air is introduced into the combustor structure between the inlet and outlet portions thereof. The aspirating air mixes with the primary combustion products, cools them, and flows with them outwardly through the catalytic converter. This essentially completes the combustion of the remaining fuel within the cooled primary combustion products, and does so at a temperature not appreciably greater than the initial combustion flame temperature to thereby substantially reduce NOx emissions without the use of flame quenching techniques. The burner assembly is representatively illustrated as being incorporated in several types of forced air heating furnaces, but could also be used in other types of fuel-fired heating appliances such as boilers and water heaters.

17 Claims, 3 Drawing Sheets

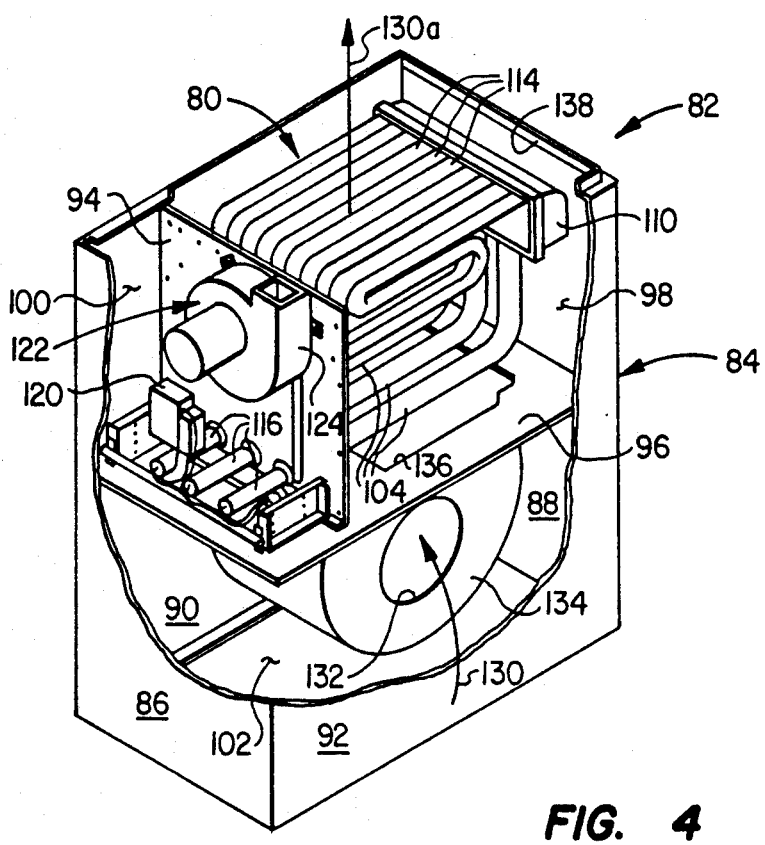
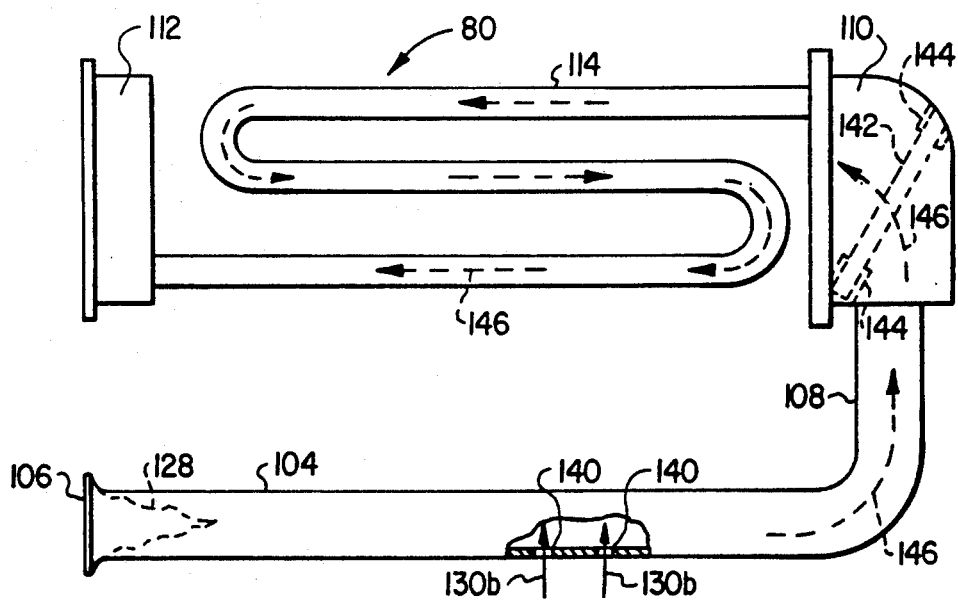

LOW NOX ASPIRATED BURNER APPARATUS

BACKGROUND OF THE INVENTION

The present invention relates generally to fuel combustion apparatus and, in preferred embodiments thereof, more particularly relates to apparatus and methods for reducing the NOx emissions of fossil fuel combustion systems such as those incorporated in water heaters and forced air heating furnaces.

In order to assure a more complete, fuel-efficient combustion of the air/fuel mixture supplied to the burner system of a fuel-fired water heater, forced air heating furnace or the like, it is common practice in the heating appliance industry to adjust the air-to-fuel ratio of the mixture to a higher than stoichiometric ratio—i.e., an "excess air" condition. Due to the nitrogen content of combustion air used as the oxygen source, an undesirable result frequently associated with the overall combustion process is the ultimate harmful emission to atmosphere of nitrogen oxides (NOx).

As is well known, the amount of emitted NOx increases as combustion temperatures increase, and also increases with higher air-to-fuel ratios of the pre-combustion air/fuel mixture. Accordingly, the conventional approach of supplying an air-rich air/fuel mixture to the heating appliance's combustion system produces both a hot combustion flame and excess air, thus compounding the NOx generation problem.

A conventional technique for reducing the amount of NOx created in the flame of a fossil fuel heating appliance is that of "quenching" the flame—i.e., inserting a heat absorbing member into the flame to conduct heat away from portions thereof. This reduces the maximum temperature attained and, consequently, the amount of NOx created in the combustion process. However, the excess or near-stoichiometric air quantity initially present in the pre-combustion air/fuel mixture still tends to undesirably elevate the level of NOx generated.

In view of the foregoing, it is accordingly an object of the present invention to provide an improved combustion system for fuel-fired heating appliances that achieves lowered NOx emission rates without the use of flame quenching techniques.

SUMMARY OF THE INVENTION

The present invention provides an improved, low NOx combustion system for use in a fuel-fired heating appliance such as, for example, a forced air heating furnace, a boiler or a water heater. The improved combustion system includes a hollow combustor structure having an inlet portion, and an outlet portion spaced apart from the inlet portion. Catalytic converter means are positioned within the outlet portion and are operative to essentially complete the combustion of a partially combusted air/fuel mixture flowed outwardly through the outlet portion across the catalytic converter means.

Burner means are provided for receiving an air/fuel mixture having a substantially less than stoichiometric air-to-fuel ratio, and partially combusting the mixture to create a burner flame and generate primary combustion products disposed within the inlet portion of the combustor structure. Means are also provided for cooling the primary combustion products and forcing them internally through the combustor structure and outwardly across the catalytic converter means to thereby essentially complete the combustion of the remaining fuel int he primary combustion products at a temperature not appreciably greater than that of the initial combustion flame. In this manner, the NOx emission level of the gases exiting the combustor structure is substantially reduced without the conventional use of flame quenching techniques.

According to a feature of the present invention, the means for cooling the primary combustion products and forcing them internally through the combustor structure and outwardly across the catalytic converter means include means for introducing a flow of aspirating air into the combustor structure, between its inlet and outlet portions. The aspirating air flow received in the combustor structure is operative to mix with and cool the primary combustion products before they reach the catalytic converter means.

In a preferred embodiment of the present invention, the low NOx combustion system thereof is incorporated in a forced air heating furnace and is used to transfer combustion heat to supply air being forced through the furnace housing externally across the combustor structure portion of the combustion system. The outlet of the combustor structure may be operatively coupled to a secondary heat exchanger to extract latent heat from the combustion gases discharged from the combustor structure, and a draft inducer fan may be utilized in place of the aspirating air flow to move the primary combustion products through the combustor structure and across the catalytic converter means.

In another representative embodiment thereof, low NOx burner structures of the present invention are uniquely incorporated in the inlet portion of the compact heat exchanger shown in U.S. Pat. No. 4,974,579. In one version of this embodiment, aspirating air openings are formed in the relatively large diameter inlet combustor tubes of the heat exchanger, and a catalytic convertor structure is operatively supported in the inlet manifold to which the combustor tubes and a series of smaller diameter, serpentined outlet tubes are connected. In another version, the aspirating air openings are eliminated, and the open inlet end of one of the combustor tubes is positioned to receive aspirating air instead of the flames delivered to the other combustor tubes by shot-type burners.

BRIEF DESCRIPTION OF THE DRAWINGS

FIG. 4 is a cut away perspective view of forced draft, fuel-fired heating furnace having therein a compact heat exchanger in which low NOx burner principles of the present invention are incorporated;

FIG. 5 is an enlarged scale, partially cut away side elevational view of the heat exchanger shown in FIG. 4.

DETAILED DESCRIPTION

Figure 1:
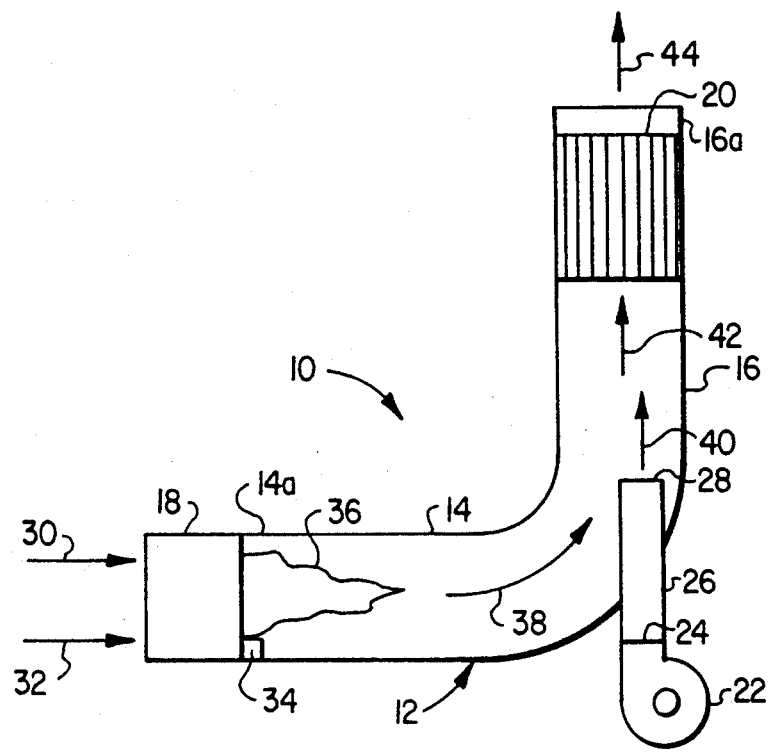
FIG. 1 is a schematic diagram of a low NOx aspirated burner assembly embodying principles of the present invention.

Schematically illustrated in FIG. 1 is a low NOx burner assembly 10 that embodies principles of the present invention and may be used is a variety of fuel-fired heating appliances such as, for example, forced air heating furnaces, boilers and water heaters. Burner assembly 10 includes a representatively tubular, generally L-shaped metal combustor structure 12 having an inlet leg 14 with an outer end portion 14a, and an outlet leg 16 with an outer end portion 16a.

A fuel burner 18 is connected to the inlet end portion 14a and, for purposes later described, a catalytic converter 20 is operatively mounted in the outlet end portion 16a. The burner assembly 10 also includes a dilution air fan 22 having an outlet 24 that communicates with the interior of the combustor structure 12 via a supply duct 26 having an outlet 28 facing the catalytic converter 20.

During operation of the burner assembly 10, air 30 and fuel 32 (such as natural gas) are delivered to the burner 18 to create a combustible air/fuel mixture having a substantially less than stoichiometric air-to-fuel ratio. By means of an igniter 34, the burner 18 partially combusts the unconventionally fuel-rich mixture to form a burner flame 36 that generates primary combustion products 38 within the inlet portion 14 of the combustor structure 12. Because of the low air content of the air/fuel mixture delivered to the burner 18, the flame 36 is relatively cool, and the NOx content of the generated primary combustion products 38 is relatively low.

Operation of the fan 22 injects a flow of dilution air 40 into the outlet portion 16 of the combustor structure 12 generally toward the catalytic convertor 20. By aspiration, the dilution air flow 40 mixes with and cools the primary combustion products 38, and forces cooled, air-diluted primary combustion products 42 outwardly through the catalytic converter 20.

The catalytic converter operates to essentially complete the combustion of the remaining fuel portion in the cooled combustion products 42, at a temperature not appreciably exceeding that of the flame 36, and also removes a substantial portion of the NOx in the cooled combustion products 42. Accordingly, the burner assembly 10 operates to essentially completely combust the incoming fuel 32, while at the same time substantially reducing the NOx level in the combustion products 44 discharged from the burner assembly, without the use of conventional flame quenching techniques. The catalytic converter is representatively of a generally conventional platinum black or platinum/palladium construction of the type used in the automotive industry to reduce hydrocarbon emissions.

Because by design the flame 36 is relatively cool and low in nitrogen content, the partially burned primary combustion products 8 benefit from both of these flame attributes in the form of lowered NOx content. The subsequent dilution and cooling of the combustion products 38, coupled with the operation of the catalytic converter 20, completes the combustion process without appreciably elevating the effective combustion temperature. Accordingly, the overall combustion process of the present invention uniquely reduces NOx emissions, by a combination of lowered maximum combustion temperature and flame nitrogen content, without appreciably diminishing fuel efficiency.

Figure 2:
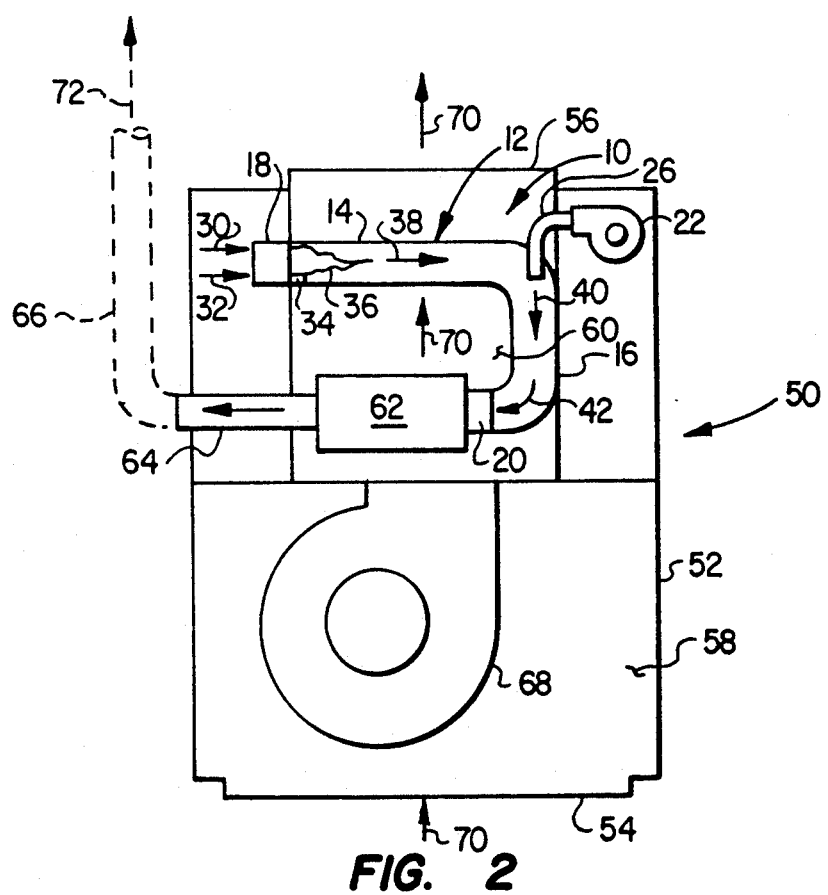
FIG. 2 is a schematic cross-sectional view through a representative fuel-fired forced air heating furnace incorporating therein a low NOx aspirated burner assembly of the present invention.

In FIG. 2 a horizontally spaced series of burner assemblies 10 are shown installed in a representative fuel-fired forced air heating furnace 50 that includes a housing structure 52 having a bottom inlet opening 54 and a top outlet opening 56. As viewed in FIG. 2, the burner assemblies 10 are spaced apart in a front-to-rear direction, with only the front burner assembly 10 being visible. At the bottom end of the housing 52 is a return air plenum 58 positioned beneath a heating flow passage 60 that communicates with the outlet opening 56. The tubular metal combustor structures 12 are positioned within the flow passage 60, with the catalytic converter ends of the combustor structures 12 being connected to the inlet side of a secondary heat exchanger 62 also positioned within the flow passage 60. An outlet 64 of the secondary heat exchanger is connected to an external vent stack 66.

During operation of the furnace 50 the cooled, diluted primary combustion products 42 are sequentially forced through the catalytic converter 20 and the secondary heat exchanger, and are then discharged through the vent stack 66. At the same time, a centrifugal supply blower 68 draws air 70 into the return plenum 58 through housing opening 54 and sequentially forces the air 70 upwardly into the flow passage 60, externally across the secondary heat exchanger 62 and the combustor structure 12, and outwardly through the housing outlet opening 56.

Combustion heat is transferred to the air 70 from both the tubular metal combustor structure 12 and the secondary heat exchanger 62. The heat transferred from the combustor structure 12 to the air 70 assists the dilution air 40 in cooling the primary combustion products 38 to thereby further facilitate the reduction in NOx emissions contained in the combustion gases 72 ultimately exiting stack 66 to atmosphere.

Figure 3:
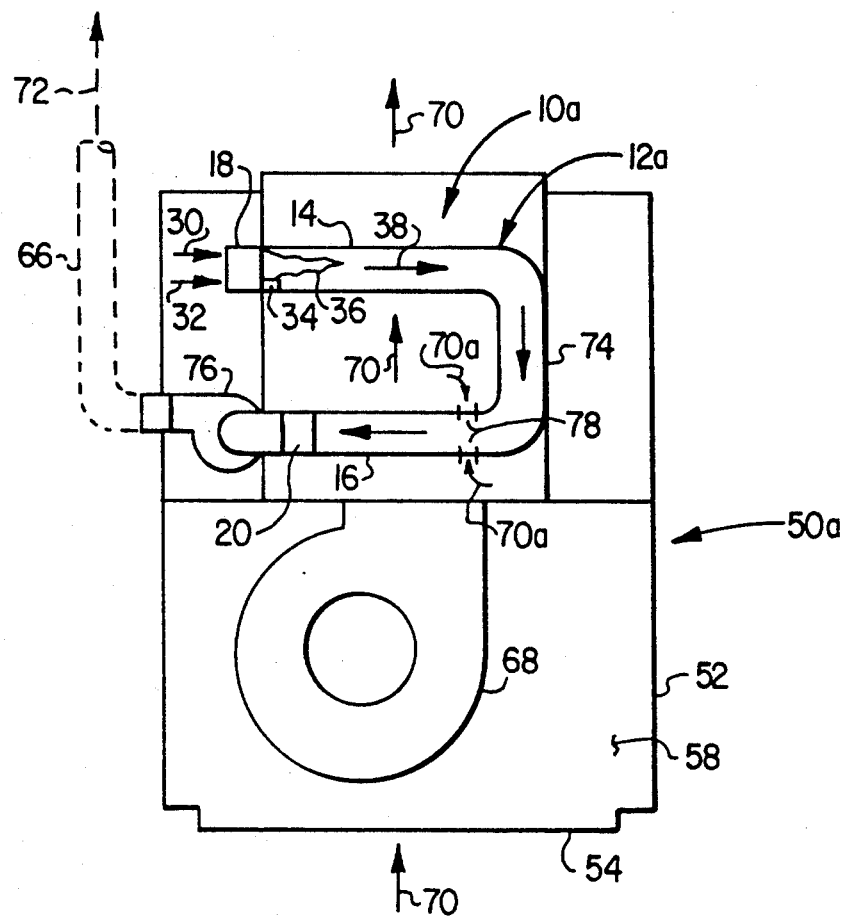
FIG. 3 is a schematic cross-sectional view through an alternate embodiment of the FIG. 2 furnace.

An alternate embodiment 50a of the furnace 50 is schematically depicted in FIG. 3 and incorporates therein a horizontally spaced series of modified versions 10a of the burner assemblies 10 shown in FIG. 2. The combustor structures 12a are positioned within the flow passage 60 and representatively have generally U-shaped configurations, with the outlet portion 16 being located below and parallel to the inlet sections 14 and connected thereto by joining sections 74.

In this embodiment of the burner assembly, the dilution air fan 22 is eliminated and replaced with a draft inducer fan 76 operatively connected as shown between the vent stack 66 and the catalytic convertor ends of the combustor structures 12a. The secondary heat exchanger 62 is also deleted for purposes of illustration, but it could be included in the overall heat exchange structure of furnace 50a if desired.

During operation of the furnace 50a, the draft inducer fan 76 draws the primary combustion products 38 through the catalytic converters 20 and discharges them into the vent stack 66, and the primary combustion products are cooled by portions 70a of the air 70 drawn into the combustor structures 12a, by the operation of draft inducer fan 76, through small aspirating inlet openings 78 formed in each of the combustor structures 12a between their burner flames 36 and their catalytic converters 20.

The low NOx burner principles of the present invention are representatively incorporated in a compact heat exchanger 80 shown in FIGS. 4 and 5 and disposed in a furnace 82. Heat exchanger 80 and furnace 82, with the exception of the combustion modifications subsequently noted herein, are identical to those illustrated and described in U.S. Pat. No. 4,974,579.

The furnace 82 is representatively illustrated in an "upflow" configuration, but could alternatively be fabricated in a downflow or horizontal flow orientation. The furnace includes a generally rectangularly cross-sectioned housing 84 having vertically extending front and rear walls 86 and 88, and opposite side walls 90 and 92. Vertical and horizontal walls 94 and 96 within the housing 84 divide its interior into a supply plenum 98 (within which the heat exchanger 80 is positioned), a fan and burner chamber 100, and an inlet plenum 102 beneath the plenum 98 and the chamber 100.

The heat exchanger 80 includes three relatively large diameter, generally L-shaped metal primary combustor tubes 104 which are horizontally spaced apart and secured at their open inlet ends 106 to a lower portion of the interior wall 94. The upturned outlet ends 108 of the primary tubes 104 are connected to the bottom side of an inlet manifold 110 which is spaced rightwardly apart from a discharge manifold 112 suitably secured to an upper portion of the interior wall 94. The interior of the inlet manifold 110 is communicated with the interior of the discharge manifold 112 by means of a horizontally spaced series of vertically serpentined metal flow transfer tubes 114 each connected at its opposite ends to the manifolds 110,112 and having a considerably smaller diameter than the primary tubes 104.

Three horizontally spaced apart shot-type main gas burners 116 are operatively mounted within a lower portion of the chamber 100 and are supplied with gaseous fuel by a gas valve 120. It will be appreciated that a greater or lesser number of primary tubes 104, and associated burners 116, could be utilized, depending on the desired heating output of the furnace.

A draft inducer fan 122 positioned within the chamber 100 is mounted on an upper portion of the interior wall 94, above the burners 116, and has an inlet communicating with the interior of the discharge manifold 112, and an outlet section 124 connectable to an external exhaust flue.

Upon a demand for heat from the furnace 82, by a thermostat (not illustrated) located in the space to be heated, the burners 116 and the draft inducer fan 122 are energized. Flames 128 from the burners 116 are directed into the open inlet ends 106 of the primary heat exchanger tubes 104, and the resulting hot combustion products are drawn through the heat exchanger 80 by operation of the draft inducer fan 122. Specifically, the burner combustion products are drawn by the draft inducer fan 122 sequentially through the primary tubes 104, into the inlet manifold 110, through the flow transfer tubes into the discharge manifold 112, from the manifold 112 into the inlet of the draft inducer fan 122, and through the fan outlet section 124 into the exhaust flue (not shown) to which the fan outlet section 124 is connected.

At the same time return air 130 from the heated space is drawn upwardly into the inlet plenum 102 and flowed into the inlet 132 of a supply air blower 134 disposed therein. Return air 130 entering the blower inlet 132 is forced upwardly into the supply air plenum 98 through an opening 136 in the interior housing wall 96. The return air 130 is then forced upwardly and externally across the heat exchanger 80 to convert the return air 130 into heated supply air 130a which is upwardly discharged from the furnace through a top end outlet opening 138 to which a suitable supply air ductwork system (not illustrated) is connected to flow the supply 130a into the space to be heated.

Referring now to FIG. 5, the low NOx burner principles of the present invention are incorporated in the compact heat exchanger 80 in the following manner. To provide the necessary flow of aspirating air for the substoichiometric, burning fuel/air mixture being introduced into the primary tubes 104, a plurality of small inlet openings 140 are formed in each of the primary tubes 104 between their inlet ends 106 and the inlet manifold 110. Operation of the draft inducer fan 122 draws small portions 130b of the return air 130 into the interior of the primary tubes 104, via the inlet openings 140, to serve as aspirating air that partially cools the burning fuel/air mixture rightwardly traversing the interiors of the primary tubes 104 during firing of the furnace.

To provide the catalytic conversion portion of the previously described low NOx combustion process, a catalytic converter panel 142 (similar in material and operation to the previously described catalytic converters) is operatively supported within the inlet manifold 110, for example by suitable interior support bracket structures 144. During operation of the draft inducer fan 122, the aspirated, partially combusted fuel/air mixture flow 146 is drawn across the converter panel 142, flowed through the serpentined tubes 114 into the discharge manifold 112, and then discharged by the draft inducer fan 122.

Figure 6:
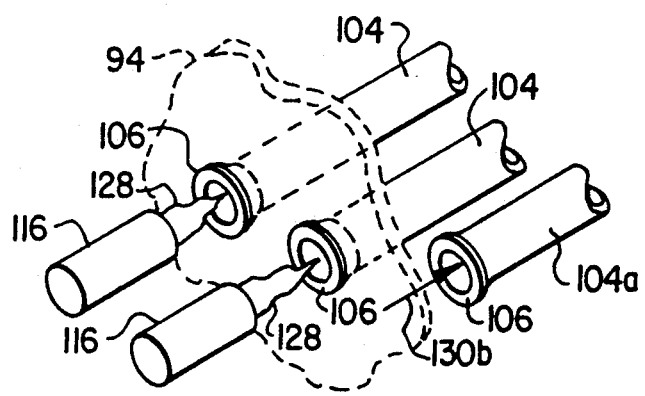
FIG. 6 is a simplified perspective view of an inlet portion of an alternate embodiment of the heat exchanger.

Referring now to FIG. 6, instead of forming the aspirating air inlet openings 140 in the primary tubes 104, one of the burners 116 may be eliminated and the open inlet end 106 of one of the primary tubes positioned behind (i.e., to the right of) the interior housing wall 94 instead of extending it through such wall for flame receipt from an associated burner. With the primary tube 104a 5 repositioned in this manner, during operation of the draft inducer fan 122 a flow of aspirating air 130b is drawn into the open inlet end 106 of the tube 104a, and through the tube 104a into the inlet manifold 110 for mixture therein with the partially combusted fuel/air mixture flows delivered to the inlet manifold 110 via the other two primary tubes 104. The aspirated burning fuel/air mixture formed in this manner in the inlet manifold 110 is then drawn across the catalytic converter panel 142 and flowed through the smaller diameter tubes 114 and into the discharge manifold 112 for delivery to the inlet of the draft inducer fan 122.

The foregoing detailed description is to be clearly understood as being given by way of illustration and example only, the spirit and scope of the present invention being limited solely by the appended claims.

What is claimed is:

1. A low NOx emission, fuel-fired heating appliance comprising:

a heat exchanger structure through which hot combustion products from a source thereof may be internally flowed and then discharged therefrom, said heat exchanger structure having an inlet and an outlet and being operative to transfer combustion heat to a fluid flowed externally across said heat exchanger structure;

wall means, formed form a highly heat conductive material, for defining at least one combustion passage having an inlet end portion for receiving a burning, substoichiometric fuel/air mixture, and an outlet end portion communicated with said inlet of said heat exchanger structure;

burner means for flowing into said inlet end portion of said at least one combustion passage a burning, substoichiometric fuel/air mixture, including a flame having a flame temperature, that partially combusts within an upstream portion of said at least one combustion passage;

air injection means for injecting a flow of aspirating air into said at least one combustion passage, intermediate said inlet and outlet end portions thereof, in a manner cooling the partially combusted, burning fuel/air mixture and forcing the cooled, partially combusted burning fuel/air mixture through said at least one combustion passage toward said outlet end portion thereof, said air injection means including an aspirating fan having an outlet communicated with the interior of each of said at least one combustion passage, and an inlet for receiving ambient air;

catalytic converter means, associated with said at least one combustion passage and entirely positioned downstream form the entry point therein of said flow of aspirating air, for intercepting and essentially completing the combustion of the cooled, partially combusted burning fuel/air mixture as it approaches said inlet of said heat exchanger structure; and means for flowing a fluid to be heated externally a cross said heat exchanger structure and said will means to thereby transfer combustion heat to the fluid from both said heat exchanger structure and said wall means and further cool to a substantial degree the partially combusted burning fuel/air mixture internally traversing said at least one combustion passage.

2. The low NOx emission, fuel-fired heating appliance of claim 1 wherein:

said catalytic converter means are operative to essentially complete the combustion of the cooled, partially combusted burning fuel/air mixture at a temperature not appreciably greater than said flame temperature.

3. The low NOx emission, fuel-fired heating appliance of claim 1 wherein:

for each of said at least one combustion passage said catalytic converter means consist of a single catalytic converter.

4. A low NOx emission, fuel-fired heating appliance comprising:

a heat exchanger structure through which hot combustion products from a source thereof may be internally flowed and then discharged therefrom, said heat exchanger structure having an inlet and an outlet and being operative to transfer combustion heat to a fluid flowed externally across said heat exchanger structure;

wall means, formed form a highly heat conductive material, for defining at least one combustion passage having an inlet end portion for receiving a burning, substoichiometric fuel/air mixture, and an outlet end portion communicated with said inlet of said heat exchanger structure;

said wall means including a plurality of tubular metal members arranged in a parallel, laterally spaced apart relationship;

burner means for flowing into said inlet end portion of said at least one combustion passage a burning, substoichiometric fuel/air mixture, including a flame having a flame temperature, that partially combusts within an upstream portion of said at least one combustion passage;

air injection means for injecting a flow of aspirating air into said at least one combustion passage, intermediate said inlet and outlet end portions thereof, in a manner cooling the partially combusted, burning fuel/air mixture and forcing the cooled, partially combusted burning fuel/air mixture through said at least one combustion passage toward said outlet end portion thereof, catalytic converter means, associated with said at least one combustion passage and entirely positioned downstream form the entry point therein of said flow of aspirating air, for intercepting and essentially completing the combustion of the cooled, partially combusted burning fuel/air mixture as it approaches said inlet of said heat exchanger structure; and means for flowing a fluid to be heated externally a cross said heat exchanger structure and said will means to thereby transfer combustion heat to the fluid from both said heat exchanger structure and said wall means and further cool to a substantial degree the partially combusted burning fuel/air mixture internally traversing said at least one combustion passage.

5. The low NOx emission, fuel-fired heating appliance of claim 4 wherein:

said heat exchanger structure is positioned upstream of said inlet end portions of said plurality of tubular metal members relative to the direction of fluid flow externally across said heat exchanger structure and said plurality of tubular metal members.

6. The low NOx emission, fuel-fired heating appliance of claim 4 wherein:

said catalytic converter means are operative to essentially complete the combustion of the cooled, partially combusted burning fuel/air mixture at a temperature not appreciably greater than said flame temperature.

7. The low NOx emission, fuel-fired heating appliance of claim 4 wherein, for each of said at least one combustion passage, said catalytic converter means consist of a single catalytic converter.

8. A low NOx emission, fuel-fired, forced air heating furnace comprising:

a housing having an inlet opening and an outlet opening;

supply fan means for flowing air to be hated through said housing from said inlet opening to said outlet opening;

at least one generally U-shaped metal combustor tube disposed in said housing in the path of air flow therethrough, said at least one generally U-shaped metal combustor tube having an open-ended inlet leg portion and an open-ended outlet leg portion spaced apart from said inlet leg portion in the direction of air flow through said housing;

burner means for flowing into the open end of said inlet leg portion of each of said at least one combustor tube a burning, substoichiometric fuel/air mixture, including a flame having g a flame temperature, that partially combusts within said inlet leg portion;

air injection means for injecting a flow of aspirating air into each of said at least one generally U-shaped metal combustor tube, generally intermediate its open ends, in a manner cooling the partially combusted, burning fuel/air mixture and forcing the cooled, partially combusted burning fuel/air mixture through the tube toward the open end of its outlet leg portion, said air injection means including an aspirating fan having an outlet communicated with the interior of each of said at least one combustor tube; and catalytic converter means, associated with each of said at least one combustor tube and entirely positioned downstream from the entry point therein of said flow of aspirating air, for intercepting an essentially completing the combustion of the cooled partially combusted burning fuel/air mixture as it approaches the open end of said outlet leg portion of said combustor tube.

9. The low NOx emission, fuel-fired, forced air heating furnace of claim 8 wherein:

for each of said at least one combustor tube said catalytic converter means consist of a single catalytic converter.

10. The low NOx emission, fuel-fired, forced air heating furnace of claim 8 wherein:

said catalytic converter means are operative to essentially complete the combustion of the cooled, partially combusted burning fuel/air mixture at a temperature not appreciably greater than said flame temperature.

11. A low NOx emission, fuel-fired, forced air heating furnace comprising:

a housing having an inlet opening and an outlet opening;

supply fan means for flowing air to be heated through said housing from said inlet opening to said outlet opening;

at least one generally U-shaped metal combustor tube disposed in said housing in the path of air flow therethrough, said at least one generally U-shaped metal combustor tube having an open-ended inlet leg portion and an open-ended outlet leg portion spaced apart from said inlet leg portion in the direction of air flow through said housing;

burner means for flowing into the open end of said inlet leg portion of each of said at least one combustor tube a burning, substoichiometric fuel/air mixture, including a flame having a flame temperature, that partially combusts within said inlet leg portion;

draft inducer fan means having an inlet communicated with the open end of said outlet leg portion of each of said at least one combustor tube, said draft inducer fan means being operative to draw the burning, partially combusted fuel/air mixture through each of said at least one combustor tube toward the open end of its outlet leg portion;

opening means formed in each of said at least one combustor tube for drawing a flow of air from within said housing into the interior of the combustor tube for mixture with and cooling of the burning, partially combusted fuel/air mixture internally traversing the combustor tube; and catalytic converter means, associated with each of said at least one combustor tube, for intercepting and essentially completing the combustion of the cooled, partially combusted burning fuel/air mixture adjacent the open end of the outlet leg portion of said at least one combustor tube.

12. The low NOx emission, fuel-fired, forced air furnace of claim 11 wherein:

said catalytic converter means are operative to essentially complete the combustion of the cooled, partially combusted burning fuel/air mixture at a temperature not appreciably greater than said flame temperature.

13. The low NOx emission, fuel-fired, forced draft furnace of claim 11 wherein:

for each of said at least one combustor tube said catalytic converter means consist of a single catalytic converter.

14. A low NOx emission, fuel-fired, forced draft furnace comprising:

a housing having an inlet opening and an outlet opening;

supply fan means for flowing air to be heated through said housing from said inlet opening to said outlet opening;

a heat exchanger disposed in said housing in the path of air flow therethrough, said heat exchanger including:
  a spaced plurality of combustor tubes each extending generally transversely to the direction of air flow through said housing and having an open inlet end, and an open outlet end,
  an inlet manifold connected to said outlet ends of said combustor tubes,
  a catalytic convertor operatively mounted within said inlet manifold,
a discharge manifold spaced apart from said inlet manifold and having an outlet,
a spaced plurality of flow transfer tubes serpentined in the direction of air flow through said housing and connected at their opposite ends to said inlet manifold and said discharge manifold, and
opening means formed in said combustor tubes for admitting cooling air into their interiors downstream from their inlet ends;

burner means for flowing a substoichiometric, burning fuel/air mixture, including flames having a flame temperature, into the inlet ends of said combustor tubes for partial combustion therein; and draft inducer fan means having an inlet connected to said outlet of said discharge manifold, said draft inducer fan means being operative to draw the fuel/air mixture through said heat exchanger from said inlet ends of said combustor tubes to said outlet of said discharge manifold, to draw air inwardly through said opening means for mixture with and cooling of the partially combusted, burning fuel/air mixture, and then flow the cooled, partially combusted burning fuel/air mixture across said catalytic converter to essentially complete the combustion of the partially combusted fuel/air mixture.

15. The low NOx emission, fuel-fired, forced air furnace of claim 14 wherein:

said catalytic converter is operative to essentially complete said combustion at a temperature not appreciably greater than said flame temperature.

16. A low NOx emission, fuel-fired, forced air furnace comprising:

a housing having an inlet opening and an outlet opening;

supply fan means for flowing air to be heated through said housing from said inlet opening to said outlet opening;

a heat exchanger disposed in said housing in the path of air flow therethrough, said heat exchanger including:
- a spaced plurality of first tubes each extending generally transversely to the direction of air flow through said housing and having an open inlet end, and an open outlet end,
- an inlet manifold connected to said outlet ends of said first tubes,
- a catalytic convertor operatively mounted within said inlet manifold,
- a discharge manifold spaced apart from said inlet manifold and having an outlet, and
- a spaced plurality of second tubes serpentined in the direction of air flow through said housing and connected a their opposite ends to said inlet manifold and said discharge manifold;

burner means for flowing a substoichiometric, burning fuel/air mixture, including flames having a flame temperature, into the inlet ends a first number of said first tubes for partial combustion therein; and draft inducer fan means having an inlet connected to said outlet of said discharge manifold, said draft inducer fan means being operative to draw the fuel/air mixture through said heat exchanger from said inlet ends of said first number of said first tubes to said outlet of said discharge manifold, the inlet ends of a second number of said first tubes being positioned to draw cooling air from the interior of said housing into the interior of said inlet manifold for mixture with and cooling of partially combusted, burning fuel/air mixture entering said inlet manifold via said first number of said first tubes and subsequently flowing across said catalytic converter, said catalytic converter being operative to essentially complete the combustion of the cooled, partially combusted burning fuel/air mixture.

17. The low NOx emission, fuel-fired, forced air furnace of claim 16 wherein:

said catalytic converter is operative to essentially complete the combustion of the cooled, partially combusted burning fuel/air mixture at a temperature not appreciably greater than said flame temperature.

* * * * *